Jan. 7, 1969 M. S. FISHER 3,421,098
SIGNAL TRANSLATING SYSTEM
Filed July 19, 1965
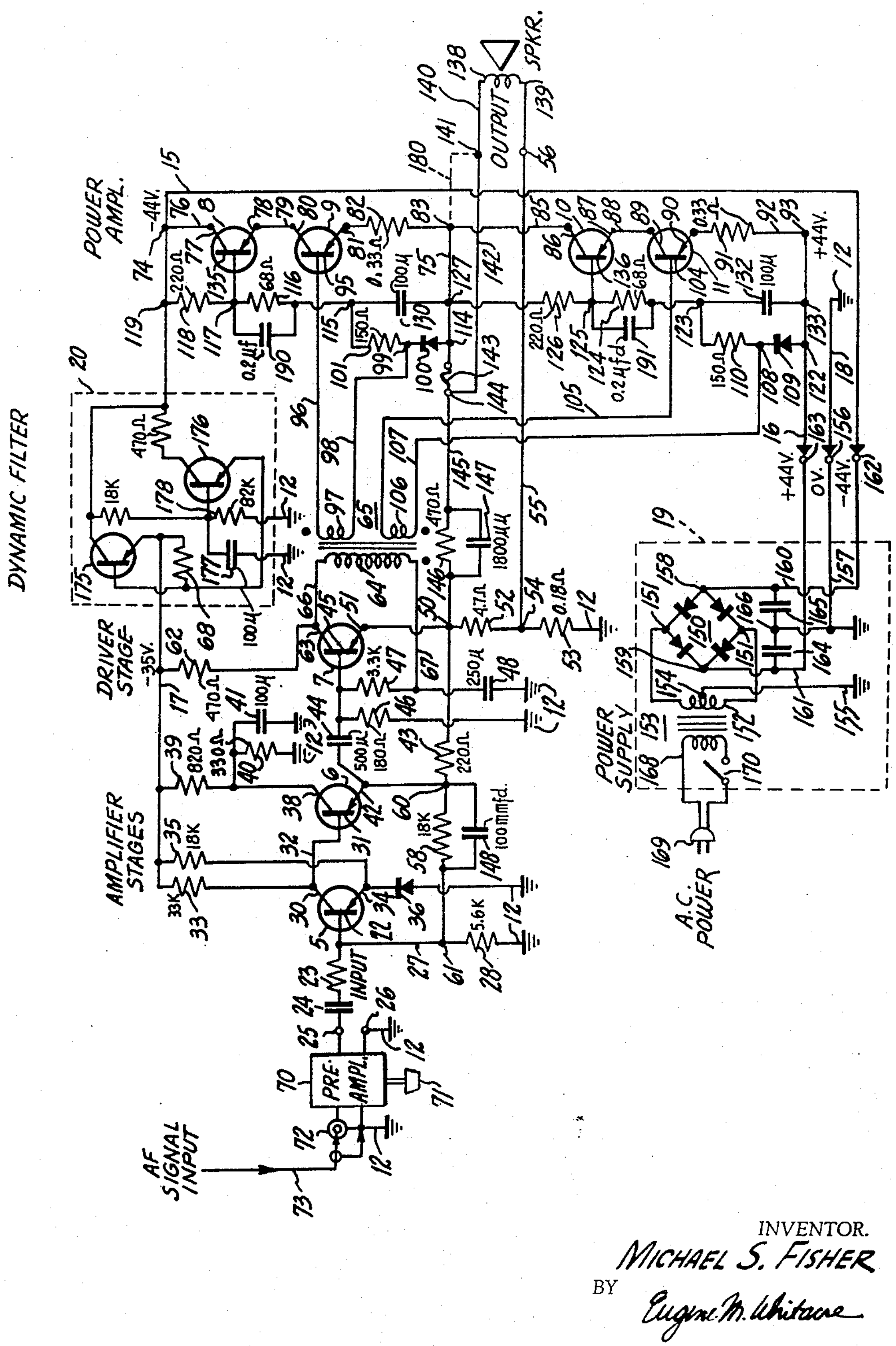
INVENTOR.
MICHAEL S. FISHER
BY Eugene M. Whitacre
Attorney United States Patent Office 3,421,098
Patented Jan. 7, 1969

3,421,098

SIGNAL TRANSLATING SYSTEM

Michael S. Fisher, Flemington, N.J., assignor to Radio Corporation of America, a corporation of Delaware Filed July 19, 1965, Ser. No. 472,945
U.S. Cl. 330—15 6 Claims
Int. Cl. H03f 3/26

ABSTRACT OF THE DISCLOSURE

Two series coupled transistors are connected in a power amplifier stage, with the first operating in a common-emitter mode driving the second operating in a common-base mode, and with a signal output load circuit connected in series coupling relation with the two transistors. A voltage divider network is provided for applying biasing potentials to the transistors, and a pair of series connected capacitors are coupled in shunt relation with separate portions of the divider network so as to cause the second transistor, and then the first, to be successively driven into saturation in response to input signals applied to the first transistor, as a result of which, maximum power is deliverable to the output load.

This invention relates to signal amplifiers and more particularly to class B and AB amplifiers.

This invention is an improvement over the circuit in the application Ser. No. 117,902, filed on June 19, 1961, by Carl F. Wheatley, Jr., now U.S. Patent No. 3,233,184 issued Feb. 1, 1966. In the Wheatley application, the class B or AB power output stages included at least two series coupled transistor devices. The two such class B or AB stages may be connected with a load, such as a loudspeaker, to provide a single ended push-pull amplifier. The signals to be amplified were applied to one of the transistors, which operated in the common emitter mode, and it in turn was connected to drive the second transistor of the pair, which operated fundamentally as a common base amplifier. A biasing network was provided for applying appropriate biasing voltages for the transistors. A single capacitor was coupled in parallel with a portion of the biasing network to control the voltage distribution along the biasing network as a function of signal voltage so that the base-collector voltage of the second transistor may become forward biased, i.e., so that the second transistor may go into saturation. The biasing network was adjusted so that the second transistor will generally go into saturation before the first transistor.

The first transistor of the pair (connected in the common emitter mode) exhibits a greater effect on the frequency response and linearity of the circuit than the second transistor (operating fundamentally as a common base amplifier). As a result it is generally desired to use a high gain (beta) power transistor, such as a drift type of germanium transistor having a high audio frequency response, as the first transistor. On the other hand, since the second transistor is less critical than the first transistor, a considerable cost savings can be realized by using a low cost, lower gain (beta) power transistor, such as an alloy type of germanium transistor, as the second transistor. Unfortunately the frequency response of the alloy type of power transistor is generally substantially lower than that of the drift type transistor. When a transistor, having a substantially lower frequency response than the first transistor, is connected into the circuit as the second transistor, the second transistor is not driven into saturation at high frequencies wherein a clipping type of action results at the high frequencies, thereby considerably reducing the power output capabilities of the amplifier at the high frequencies.

It is therefore an object of this invention to provide a lower cost and improved single ended push-pull amplifier employing at least two power transistors, wherein a first power transistor exhibits a frequency response that is substantially greater than a second power transistor, that provides for the saturation of both transistors at high frequencies.

In accordance with the invention, at least two series-coupled transistors are connected as class B or AB stage adapted to drive a load, such as a loudspeaker in a single ended push-pull amplifier. A signal to be amplified is applied to one of the transistors connected to operate as a common emitter driving the second stage, which operates fundamentally as a common base amplifier. A biasing network is connected to the transistors including two capacitors. The capacitors cooperate in a manner so that the voltage distribution along the biasing network will change with the signal voltage so that the second transistor may go into saturation at high frequencies even though its current gain at high frequencies is substantially lower than the first transistor.

The novel features which are considered to be characteristic of this invention are set forth with particularity in the appended claims. The invention itself, however, both as to its organization and method of operation as well as advantages thereof, will best be understood from the following description when read in connection with the accompanying drawing illustrating a schematic circuit diagram of a transistorized audio-frequency signal amplifier system embodying the invention.

Referring to the drawing the audio-frequency amplifier shown comprises (1) a pair of input signal amplifier stages which include, as the active amplifier elements or devices thereof, a pair of transistors 5 and 6, (2) a driver stage having a transistor 7 as the active amplifier element or device thereof, and (3) a power amplifier of the single ended push-pull type having a pair of series-connected transistors 8 and 9 in one half thereof and a pair of series-connected transistors 10 and 11 in the other half thereof.

Operating currents and voltages for the transistor elements of the amplifier stages with respect to common ground 12 for the system, are provided at a negative supply lead 15, a positive supply lead 16, and a second negative supply lead 17. In the present example, the negative supply lead 15 may be considered to operate at substantially −44 volts, the supply lead 16 at +44 volts and the supply lead 17 at −35 volts, all with respect to ground 12 for the system and a common ground supply lead 18. To receive these operating voltages the supply leads 15, 16 and 18 are connected with a suitable power supply unit 19 as will hereinafter be described and the negative supply lead 17 is connected with the negative supply lead 15 through a suitable dynamic filter network 20, also as will hereinafter be described.

In the present example, it will be noted that the input terminals 25–26 for the amplifier are connected with a signal preamplifier 70 forming part of a receiver, phonograph or other apparatus with which the amplifier is used, and having the usual controls including a volume control element indicated at 71, for controlling the signal input level. The preamplifier is provided with a shielded input terminal 72 connected to chassis ground and adapted to be connected with a shielded input conductor or line 73 from any suitable source of signals.

Signals from the input terminal 25 are applied to the base 22 of the first stage transistor 5, which is shown as a PNP germanium transistor, through a series circuit including an input resistor 23 and an input coupling capacitor 24. The base 22 is also connected to common ground 12 through a lead 27 and a base resistor 28.

The collector 30 of the first stage transistor 5 is directly coupled to the base 31 of the second stage transistor 6 through a conductor 32 across the impedance of a collector coupling resistor 33 which is connected between the collector 30 and the negative supply lead 17. The emitter 34 is provided with an emitter biasing connection to common ground 12 through a voltage stabilizing diode 36, which in the present instance is a silicon diode. The diode 36 is connected in series with emitter current path of the transistor 5, and its particular forward biased operating point is set by the resistor 35 which is connected between the cathode of the diode 36 and the negative lead 17.

The collector 38 of the second stage transistor 6 is connected to the negative supply lead 17 through a collector resistor 39 and, to set the proper voltage on the collector, a bleeder resistor 40 is connected between the collector and common ground in parallel with a filter capacitor 41. In this case the second stage transistor 6 operates as an emitter follower, and the signal output is taken from the emitter 42 through a coupling connection including a coupling capacitor 44 between the emitter 42 and the base 45 of the driver stage transistor 7.

A feedback path is provided between the emitter 42 of the second amplifier stage and the base 22 of the first stage. The feedback path includes a resistor 58 connected between the emitter end of the resistor 43 at a terminal 60 and a terminal 61 on the lead 27 connected to the base 22. In this regard it will be noted that the bias voltage at the base 22 of the transistor 5 is determined by the voltage at the emitter 42 of the transistor 6 and the relative values of the resistors 28 and 58. A capacitor 148 is connected in parallel with the resistor 58 to provide phase correction of high frequencies for optimum high frequency response. The operating point of both the first and second stage amplifiers are made exceptionally stable by the inclusion of the diode 36 in the emitter circuit of the first stage transistor 5 so that a relatively large amount of D-C loop feedback may be applied through the resistor 58. The stability is important to maintan the optimum operating point for the transistors 5 and 6 and thereby insure low distortion from the predriver or amplifier stages in a power amplifier of this type.

The second stage amplifier 6 is coupled to the driver transistor 7 with a bootstrap arrangement in order to reduce the A-C loading on, and hence the distortion produced by, the second stage amplifer 6. As mentioned above, the emitter 42 of the transistor 6 is coupled to the base 45 of the driver transistor 7 through a coupling capacitor 44. Audio signals are developed across a base resistor 46 connected between the base 45 and ground 12.

The emitter resistor 43 is connected between the emitter 42 and a terminal 50 which is connected with the emitter 51 of the driver stage transistor 7 and with a pair of series connected emitter circuit feedback resistors 52 and 53 of low resistance, the latter being connected to common ground 12. In the bootstrap arrangement, the signal voltage at both ends of the resistor 43 vary in the same sense, hence resulting in low signal current flow therethrough. This is because the voltage at the emitter 42 tends to vary with signal, and in like manner the emitter 51 voltage of the transistor 7 also varies with signal in the same sense and at about the same amplitude level with respect to ground due to the high degree of negative feedback applied to the emitter of transistor 7 from succeeding stages. This circuit arrangement provides the advantages of permitting a relatively high D-C current through the resistor 43 without requiring additional signal or A-C current from the transistor 6. The net result of the foregoing is that the transistor 6 draws less signal current thereby permitting a greater gain, and increased linearity.

The output circuit for the driver stage includes a load resistor 62 connected between the collector 63 and the negative supply lead 17. Across the impedance of the resistor 62 is connected the primary winding 64 of an output coupling or driver transformer 65. The high signal potential end of the primary winding 64 is connected with the collector 63 through a lead 66 and the low potential end of the primary winding 64 is connected through a lead 67 to chassis ground through a signal bypass capacitor 48. Thus no appreciable D-C current flows through the primary winding 64 to cause distortion due to partial saturation of the core of the transformer 65.

The large D-C load resistor 62 in the collector circuit of the transistor 7 provides operating point stability through collector-to-base feedback biasing, eliminating the need for a large bypassed emitter resistor and its associated low frequency phase shift. The D-C feedback is provided through a resistor 47 which is connected between the low signal potential end of the primary winding 64 and the base 45.

Since the collector current of the transistor 7 flows through the resistor 62, the D-C voltage at the collector 63 reflects any changes in the current flow which might be caused by temperature change or the like. The bias connections through the resistors 46 and 47 tends to maintain the transistor operating current constant, thereby providing D-C stabilization. This is another feature of the present invention in that the number of components required for D-C stabilization is less than that required for prior circuits. In prior circuits, a pair of series resistors, and an intermediate shunt capacitor is connected between the collector and base of a transistor for D-C stabilization. The capacitor, of course, provides a signal bypass to prevent A-C degeneration. In the present circuit, the D-C blocking capacitor ordinarily connected between the collector and the output transformer in prior circuits, is connected between the low signal potential side of the output transformer and ground and doubles as the signal bypass capacitor in the D-C feedback circuit. This connection thus requires one less resistor and one less capacitor than prior circuits.

The low-frequency distortion is greatly reduced in the driver stage circuit by the R-C coupling of the driver transformer primary 64 to the collector 63 of the driver stage transistor 7, thereby eliminating the D-C flux unbalance in the transformer core. Thus the driver transformer 65 is not an appreciable limiting factor relative to low frequencies in the design of the high performance amplifier shown because there is no D-C flux unbalance to limit the low frequency response and linearity. By way of example, the leakage inductance in the transformer shown is minimized by "pentafilar" winding wherein five conductors are random-wound on a form and three of the conductors are connected in series to make up the primary and the other two form the two secondaries.

The coupling transformer 65 includes a nylon bobbin with end portions included to prevent the windings from slipping off. With such a bobbin the three primary conductors (using No. 30 wire for example) and the two secondary conductors (using No. 26 wire for example) may be simultaneously wound to provide a "pentafilar" winding.

Thus the driver transformer 65 is not an appreciable limiting factor relative to high frequencies in the design of the high performance amplifier shown because there is very tight coupling and low leakage inductance between primary and both secondaries.

To achieve extremely low distortion before feedback, the driver stage is designed to provide many times the power normally required to drive the output stage to full output power.

The power amplifier or output stage is of the single-ended push-pull type, one half of the amplifier circuit including the transistor amplifier devices 8 and 9 and the other half of the amplifier circuit including the transistor amplifier devices 10 and 11. The collector-to-emitter current path of each pair of amplifier devices and the load, such as the loudspeaker is connected in series. Since both halves of the push-pull power amplifier are identical, only the top amplifier portion will be described in detail.

With respect to the transistors, 8 and 9, the collector-emitter series current path may be traced from the negative supply conductor 15 at a terminal 74 thereon through a circuit lead 76 to the collector 77 of the transistor 8, and from the emitter 78 thereof through a connection lead 79 to the collector 80 of the transistor 9. Thence, the series connection can be traced from the emitter 81 of the transistor 9 through a series limiting resistor 82 to the lead 75 at a terminal 83. From the terminal 83, the series circuit continues through the loudspeaker, the emitter resistor 53 of the driver amplifier stage 7, ground and the power supply back to the collector 77 of the transistor 8.

The base 95 of the transistor 9 is connected through a signal supply lead 96 with one secondary winding 97 of the coupling transformer 65, and this in turn is conconnected through a bias supply lead 98 with a terminal 99 which is the junction of a series connection of a diode 100 and a resistor 101, the diode being poled with respect to the conductor 75 and the resistor 101 to receive a forward bias.

The diode 100 and the resistor 101 are effectively part of a series string of voltage divider elements or resistors substantially paralleling the series collector-emitter circuit connection of the transistors 8 and 9 between the negative supply lead 15 and the conductor 75. The voltage divider circuit or network may be traced from the terminal 114 on the conductor 75 through the diode 100 and the resistor 101 to a terminal 115. The path then continues through resistor 116 to a terminal 117, and from the latter through a series resistor element 118 to a terminal 119 on the supply lead 15. A bypass capacitor 130 is connected between the conductor 75 and the terminal 115 which is between the resistor elements 101 and 116 on the voltage divider network.

The second transistor of each half of the push-pull circuit, that is, the transistors 8 and 10, are provided with a base connection with a voltage-divider network in each half of the circuit. To this end the base 135 of the transistor 8 is connected directly to the terminal 117 which is a tap point between the resistor elements 116 and 118. Applicant's improvement includes the connection of a capacitor 190 across the resistor 116. The capacitor 190 cooperates with the capacitor 130 to provide for the saturation of the transistor 8 even though the frequency response (gain versus frequency) of the transistor 8 is substantially lower than that of the transistor 9, as will be discussed hereinafter.

Power output from the push-pull amplifier circuit is applied to a loudspeaker 138 connected between the conductor 75 and the terminal 54 between the emitter resistors 52 and 53 of the transistor 7. One supply lead 139 of the speaker is connected through the output terminal 56 to the junction of the emitter resistors 52 and 53 of the driver transistor 7. The opposite supply lead 140 of the speaker is connected to the output terminal 141, which in turn is connected through a lead 142 and a fuse 143 to the terminal 114 on the conductor 75. It will be noted that an output terminal 144 of the fuse 143 is also connected with the feedback lead 145 and the series feedback control resistor 146 therein to the terminal 50, on the emitter circuit resistor network 52–53 to ground 12. The feedback resistor 146 is provided with a "speed-up" by pass capacitor 147, which is connected in parallel with the resistor 146 to provide phase correction at high frequencies for optimum high frequency response.

The output circuit through the speaker 138 may be traced through the resistor 53 to common ground 12. This places a feedback voltage proportional to the current through the speaker across the resistor 53 in the emitter circuit of the driver stage. At the same time, voltage feedback, proportional to the voltage across the speaker 138, is provided from the terminal 144 through the feedback resistor 146 to the series-connected resistors 52 and 53 in the emitter circuit of the driver stage. These are relatively low resistance elements and may be considered in the present example to be of a value of 4.7 ohms for the resistor element 52 and substantially .18 ohm for the resistor element 53. Other values of resistor elements in the circuit are set at 220 ohms for each of the resistors 118 and 126, 68 ohms for each of the resistors 116 and 124, and a value of 150 ohms for each of the resistors 101 and 110. The resistors 82 and 91 may be considered to have a value of substantially 0.33 ohm each, the capacitors 130 and 132 have a value of 100 $\mu$fd. the capacitors 190 and 191 have values of 0.2 $\mu$fd. and certain other values are indicated in the circuit diagram.

The power supply means for the system may be of any suitable type providing adequate regulation. The power supply unit 19 consists of a center-tapped, full-wave rectifier bridge 150 having input terminals 151 connected with the ends of the secondary winding 152 of a power supply transformer 153, the center tap 154 of which is connected to chassis ground 155 for the unit. This ground, in turn, is connected to a zero-voltage output terminal 156 for the unit through a supply lead 157. The bridge output terminals 158 and 159 are connected through conductors 160 and 161 with output terminals 162 and 163 respectively, for the unit. Filter capacitors 164 and 165 are connected serially between the leads 160 and 161, with the capacitor junction 166 connected to ground 155 for the unit.

The power transformer 153 is provided with an input or primary winding 168 which is adapted to be connected to the usual electrical wall outlet power supply means (not shown) through a suitable plug connector 169 connected therewith. Energization of the power supply unit is provided through a control switch 170 in this connection. The supply leads 15, 16 and 18 for the amplifier are connected with the terminal 162, 163 and 156 respectively for receiving the power supply voltages therefrom.

The full-wave bridge with capacitive input filter provides a symmetrical plus and minus operating voltage or current supply means for the amplifier system. It may be noted that the secondary winding 152 of the supply transformer is preferably bilfilar wound to eliminate any 60 cycle square wave caused by nonlinearity in the iron of the core.

The coupling and filtering of the power supply for the driver stages 5, 6 and 7 is accomplished by the dynamic filter 20 which comprises two transistors 175 and 176 and a filter capacitor 177 as the main elements thereof, the filter capacitor being provided with a shunt load resistor 178, and both being connected to system ground for the amplifier system. In the present example, the unit is built into or incorporated in the system and connected between the negative supply leads 15 and 17. Since transistorized dynamic filters of this type are known and since the filter circuit shown is only by way of example and is not part of the present invention, further description is believed to be unnecessary. In the present system, as desired for operation, the filter may be considered to have an effective time constant of substantially two seconds and to provide better than 66 db of filtering. Since this is a single time constant, the phase shift of low frequency signals fed back via the conductors 15 and 17 through the dynamic filter 20 is limited to 90°, thereby reducing any tendency toward motor boating. The long time constant causes all of the low level stages to turn on slowly thereby substantially eliminating an objectionable turn on transient.

Because of the high power capabilities of the amplifier at very low frequencies, the loudspeaker or output device 138 may be protected by a fuse such as the fuse 143. This is chosen to limit the power delivered to the speaker to its power rating. The use of the fuse in series with the high output impedance of the output stage and inside the voltage feedback loop insures that no distortion will be added due to the nonlinearity of the fuse. Otherwise, the output terminal 141 could be connected directly to the conductor 75, for example at the terminal 83, through a connection indicated by the dotted line 180.

About 35 db of feedback is used around the two final stages. Combined current and voltage feedback through the leads 55 and 145 from the push-pull output stage to the emitter resistors 52–53, is used to provide a unity damping factor on the lead which can be varied from 0.2 to 5 by changing the resistors 52 and 53 and 146 and the capacitor 147. The total power gain of the driver end power output stages is substantially 40 db in the present example. It may be noted also that the predriver stages provide by the transistors 5 and 6 have about 30 db of voltage feedback through the resistor 58 and capacitor 148 to the first base 22 and a total net signal gain of substantially 30 db. The feedback loop for the predriver stages 5 and 6 is essentially independent of the feedback loops from the power amplifier stage to the driver stage transistor 7.

In considering the operation of the single-ended push-pull amplifier attention is directed first to the biasing circuit which permits both transistors 8 and 9 to go into saturation. To this end, a forward bias of about 0.25 volt for the base 95 and emitter 81 electrodes of the transistor 9 is developed across the germanium diode 100. A voltage of about −15 volts appearing at the terminal 117 is applied to the base 135 of the transistor 8, and a voltage of about −9 volts appears at the terminal 115. These voltages are referenced to ground under no signal conditions. Under the no signal conditions the conductor 75 is essentially at ground potential so the −9 volts at the terminal 115 appears directly across the capacitor 130 and −6 volts appears directly across the capacitor 190.

When a signal voltage applied to the transistor 9 swings in the direction to cause this transistor to conduct current, the resultant collector current flows through the transistor 8 and the speaker 138. To deliver appreciable output power, the transistors 8 and 9 must go into saturation. To drive the transistor 8 into saturation, means must be provided to establish a large emitter 78-base 135 current when the collector 77-base 135 voltage is substantially zero.

If the transistors 8 and 9 are of the same type, for example both are high gain drift type transistors, the difference in the frequency response of the same type of transistors is not great wherein the capacitor 130 can provide the required current to drive the transistor 8 into saturation. As mentioned above the current through the transistor 8 and 9 also flows through the speaker 138. This causes the conductor 75 to become negative with respect to ground. The voltage at the terminal 115 is equal to the sum of the negative voltage on the conductor 75 and across the capacitor 130. At some point during the signal wave cycle, the negative voltage at the terminal 115 with respect to ground will exceed the negative voltage at the terminal 119 which is fixed at −44 volts. The currents in the voltage divider will then be redistributed so that additional base 135 current for saturation will flow toward the terminal 115 through the resistor 116, and hence will not be in a direction to increase or sustain the reverse collector 77-base 135 voltage. Under these conditions the terminal 117 may be slightly more negative than the −44 volts at the terminal 119, so that the base 135-collector 77 junction becomes forward biased, thereby permitting the transistor 8 to go into saturation.

A cost savings can be realized by employing low cost alloy type of germanium power transistors as the fundamentally common base transistors 8 and 10 and by including the capacitors 190 and 191. without sacrificing the frequency response of the amplifier. For example a low cost, low frequency response or frequency cutoff ($f_{hfb}$) alloy power transistor such as an RCA 40051 can be used rather than the more expensive 2N2147 drift type transistor. The alloy power transistor can not be effectively used as the common emitter transistors 9 and 11 since its frequency cutoff or response is too low when connected in the common emitter configuration to provide the required frequency response for a high fidelity amplifier. The drift type transistor having a higher frequency cutoff or frequency response is more suitable to be employed as the common emitter transistor 9 and 11.

The current gain of an alloy type transistor is notably lower at high frequencies than the drift type transistor specially at frequencies above 5000 cycles. Without the capacitor 190 and employing a lower frequency response alloy transistor as the common base transistor 8, the transistor 8 can not be driven into saturation at high audio frequencies. The amount of base current drive required to drive the alloy type transistor into saturation at high audio frequencies is greater than that which can be supplied by the capacitor 130 through the resistor 116.

The capacitor 190 effectively bypasses the resistor 116 at high audio frequencies thereby providing a lower base current impedance path between the base of the transistor 8 and the capacitor 130. As a result, a greater amount of base current drive is provided for saturating the transistor 8 to compensate for the reduced transistor gain at the high audio frequencies. For example, without the capacitors 190 and 191 the amplifier employing an alloy transistor (RCA 40051) as transistors 8 and 10 and a drift transistor (2N2147) as transistors 9 and 11 the amplifier was only able to produce 15 watts of output at 20,000 cycles. On the other hand with the capacitors connected as designated, the amplifier produced 35 watts at 20,000 cycles. In addition to the foregoing, optimum operation is effected when the transistor 8 goes into saturation prior to the transistor 9. This may be achieved by designing the voltage divider network so that the terminal 115 voltage at the time of saturation is sifficiently more negative than the voltage at terminal 119 to accommodate the base 135 current from the transistor 8 through the resistor 116 and the capacitor 190 required for saturation.

The other half of the push-pull power amplifier including the transistors 10 and 11 operates in the manner described above. Signals are applied to the two halves of the output stage in push-pull so that one half including the transistors 8 and 9 conducts when the other half including transistors 10 and 11 are cut-off and vice versa.

The transistor 9 is stabilized against thermal runaway by insuring that the resistance in the base bias network which includes the dynamic resistance of the diode 100, the D-C resistance of the secondary winding 97 and base resistance of the transistor is low with respect to the beta of the transistors times the emitter resistor 82. In addition thermal stabilization is provided by the forward biased diode 100. The transistor 11 is stabilized in the same manner.

In addition to temperature stabilization, the diode 100 provides voltage stabilization for the transistor 9. This is desirable because the voltage at the terminal 115 reduces under strong signal and varies under low frequency signal conditions. Either of the above mentioned variations would cause cross-over distortion unless greatly suppressed, as is done by the diode 100. The foregoing is also true with respect to the diode 109 and transistor 11.

Since the transistors 8 and 10 are controlled from a high impedance emitter current source (the transistors 9 and 11), thermal stability thereof is not critical. Of the four transistors in the power output stage, only two need to be stabilized against thermal runaway.

A higher supply voltage may be used with the power amplifier of the invention than with other known types of class B or AB circuits. This is because the two transistors 8–9 and 10–11 are connected in series. In addition the collector 77-emitter 78 breakdown voltage of the transistor 8 which is operated in the common base mode, is higher than that of a common emitter stage such as transistor 9. The higher voltage power supply has the advantage that for a given power less current is drawn thereby permitting the use of less expensive lower valued electrolytic capacitors. In addition the distortion is lowered because for a given power the current swing will be less thereby avoiding problems associated with driving the transistors into nonlinear operating regions.

This leads to another important advantage of the present invention. The higher breakdown voltage between emitter 78-collector 77 of transistor 8 coupled with the greater thermal stability of the transistor 8 with respect to the transistor 9, permits a greater power output to be delivered to the speaker 138 from the transistor 8 than is the case with the transistor 9. For example, in the amplifier circuit of FIGURE 1, which is capable of delivering in excess of 50 watts with distortions of less than 0.1%, the transistors 8 and 10 deliver approximately 35 watts while the transistors 9 and 11 deliver approximately 15 watts. To highlight the advantage of the latter feature, it should be noted that in prior circuits the power output from each transistor is equal, and limited by the requirements for thermal stability and collector-to-emitter breakdown voltage.

Power supply filtering must be reasonably good for conventional push-pull output circuits to reduce ripple currents in the D-C supply because of imperfect cancellation of ripple currents in the output circuit. In the present circuit the problems of ripple currents in the D-C supplies are greatly reduced so that the power supply filtering is less critical and a simplified unit such as shown at 19 may be used effectively. It will be seen that the high output impedance of the common base connection of the second transistors 8 and 10 in the output stage limits to a very small value the ripple current through the signal path provided thereby. No ripple voltages are applied to the bases that can be amplified with the signal. In other words, the high impedance in the emitter of the second transisors 8 and 10, which is the output impedance of the driver transistors 9 and 11, keeps any ripple component that appears on the base of the transistors 8 and 10 from being amplified. No ripple components appear on the bases of the driver transistors 9 and 11 due to the bypassing action of the capacitors 130 and 132. The only ripple currents flowing in the speaker 138, are the unbalanced portions thereof flowing through the voltage divider networks and through the voltage stabilizing capacitors 130 and 132. The resistance of the voltage divider networks is high relative to that of the speaker 138 so that the unbalanced ripple component, which is small initially, is still further attenuated. Additional ripple suppression is obtained as a result of the current and voltage feedback to the driver transistor 7. In the amplifier shown the ripple output is 100 db below the 50 watt output level.

What is claimed is:

1. A signal amplifier having a power amplifier output stage comprising in combination, two series coupled transistor devices, a first of said devices connected for operating in a common-emitter mode as a driven signal input element thereof and a second of said devices connected for operating in the common-base mode in driven signal-translating connection from the first transistor device, a common signal output load circuit connected in series coupling relation with said transistor devices, means providing a series-resistor voltage divider biasing network for said transistor devices connected for applying operating base voltages thereto, voltage stabilizing means including a diode in series with said voltage divider biasing network, first and second series connected capacitors and means connecting each of said first and second capacitors in shunt relation with separate portions of said biasing network for controlling the voltage distribution along said network, whereby said first and second capacitors cooperate to drive the second and the first devices successively into saturation for maximum power output to said load circuit in response to high-amplitude applied signals.

2. A signal power amplifier comprising in combination, two series-coupled transistor devices, a first of said devices connected for operating in a common-emitter mode and having a base input circuit, a second of said devices having a lower current gain at high audio frequencies than said first device connected for operating in the common-base mode in driver signal translating connection from said first transistor device through series coupling therewith, a load circuit, common circuit means series coupling said transistor devices with said load circuit, means for applying a signal to the first of said devices as a common-emitter amplifier and the second transistor device serially therefrom as a common-base amplifier, means providing a biasing network for said transistor devices for applying operating base voltages thereto, and voltage stabilizing means in said network including a first and second series connected capacitors, each of said capacitors being separately connected in shunt between spaced voltage control points on said network for changing the voltage distribution along the network changes with signal voltage variation and for forward biasing the base-collector voltage of the second transistor device for operation thereof into full current saturation and maximum power output to said load circuit, in response to high amplitude applied signals at the input circuit of the first transistor device.

3. A single-ended transistorized power amplifier comprising in combination, two transistor devices each having a base, an emitter and a collector, one of said transistors exhibiting a current gain at high audio frequencies that is substantially greater than the other means providing an output load circuit for said amplifier, a source of operating current for said amplifier, means providing a circuit connection series-coupling said transistor devices collector-to-emitter with said load circuit and said operating current supply source, means for applying an input signal to the base of said one transistor device for operation in a common-emitter mode and thereby to drive said other transistor device through the series-coupling circuit from collector to emitter in a common-base mode, means providing a biasing network for said transistor devices connected for applying base operating voltages thereto, a pair of series connected capacitors and means connecting said first and second capacitor means in shunt with a portion of said biasing network for effecting a voltage distribution along said network variable with signal voltage variation to affect forward-bias operation of said other transistor device into saturation in response to an applied high audio signal of relatively high amplitude.

4. In a signal translating system, a transistorized power amplifier comprising at least two transistor devices each having base, collector and emitter electrodes and being directly series coupled collector-to-emitter from a first to a second of said devices, said first transistor exhibiting a higher frequency response than said second transistor, means providing a low impedance signal output circuit connected with said series coupled devices for receiving output signals therefrom in series relation, means for applying operating current to said series-coupled and connected transistors and load circuit, means providing an input circuit for applying signals to be amplified directly to the base of said first transistor device, means for controlling the operation of said first transistor device as a linearly-controlled common-emitter amplifier to drive the second transistor device as a common-base amplifier and into current saturation in advance of said first transistor device for increased power output, means providing a series-resistance biasing network connected for applying operational base voltages to said devices, voltage-stabilizing and control means in said network including a control diode connected serially therein, a first capacitor connected in shunt relation to a portion of said network and said diode, and a second capacitor serially connected to said first capacitor and connected in shunt relation with another portion of said biasing network whereby the voltage distribution along the network varies in response to a variation in signal amplitude to effect forward bias of the base voltage of said second transistor device and current saturation for both of said transistors, said network being adjusted whereby the second transistor goes into saturation in advance of the first transistor and whereby the first transistor is effective to deliver a given power to the load and the second transistor delivers substantially more than twice as much power thereto as the first transistor.

5. A push-pull transistor amplifier comprising:

means providing an operating potential supply having a pair of terminals;

first and second transistors, each including base, emitter and collector electrodes, means connecting said transistors in series in the order named between the terminals of said operating potential supply, with the collector electrode of the first transistor connected to the emitter electrode of the second transistor;

output circuit means adapted to be coupled between the emitter electrode of said first transistor and the collector electrode of said second transistor;

a voltage divider network connected between the collector electrode of said second transistor and the emitter electrode of said first transistor, the base electrode of said second transistor being connected to a first point on said voltage divider network;

a first capacitor connected between a second point on said voltage divider network further removed from said second transistor collector than said first point and the emitter electrode of said first transistor;

a second capacitor connected between said first and second points on said voltage divider network; and a signal input circuit connected between the base electrode of said first transistor and a third point on said voltage divider network further removed from said second transistor collector electrode than said second point.

6. A push-pull transistor amplifier comprising:

means providing an operating potential supply having a pair of terminals;

first, second, third and fourth transistors, each including base emitter and collector electrodes, means connecting said transistors in series in the order named between the terminals of said operating potential supply with the collector electrodes of the first, second and third transistors respectively connected to the emitter electrode of the second, third and fourth transistors;

output circuit means adapted to be coupled between the junction of said second and third transistors and said operating potential supply;

a first voltage divider network connected between the collector electrode of the fourth transistor and the junction between said second and third transistors, the base electrode of said fourth transistor being connected to a first point on said first voltage divider network;

a first capacitor connected between a second point on said first voltage divider network further removed from said fourth transistor collector than said first point and the junction between said second and third transistors;

a second capacitor connected between said first and second points on said first voltage divider network;

a first signal input circuit connected between the base electrode of said third transistor and a third point on said first voltage divider network further removed from said fourth transistor collector electrode than said second point;

a second voltage divider network connected between the junction of said second and third transistor and the emitter electrode of said first transistor, the base electrode of said second transistor being connected to a first point on said second voltage divider network;

a third capacitor connected between the emitter electrode of said first transistor and a second point on said second voltage divider network further removed from said junction between said second and third transistors than said first point, a fourth capacitor connected between said first and second points on said second voltage divider network, and a second signal input circuit connected between the base electrode of said first transistor and a third point on said second voltage divider network further removed from said junction between said second and third transistors than said second point.

References Cited

UNITED STATES PATENTS 3,233,184 2/1966 Wheatley ------------ 330—28

FOREIGN PATENTS 859,045 1/1961 Great Britain.

ROY LAKE, *Primary Examiner.*

L. J. DAHL, *Assistant Examiner.*

U.S. Cl. X.R.

330—22